US009481327B2

(12) United States Patent
Shibata et al.

(10) Patent No.: US 9,481,327 B2
(45) Date of Patent: Nov. 1, 2016

(54) WIRE HARNESS AND WIRE FITTING

(71) Applicants: SUMITOMO WIRING SYSTEMS, LTD., Yokkaichi-shi, Mie (JP); SUMITOMO ELECTRIC INDUSTRIES, LTD., Osaka-shi, Osaka (JP); AUTONETWORKS TECHNOLOGIES, LTD., Yokkaichi, Mie (JP)

(72) Inventors: Hideaki Shibata, Mie (JP); Tatsuya Shimada, Mie (JP); Iwao Wada, Mie (JP); Yoshiaki Yamano, Mie (JP); Atsushi Kasamatsu, Mie (JP)

(73) Assignees: SUMITOMO WIRING SYSTEMS, LTD., Mie (JP); SUMITOMO ELECTRIC INDUSTRIES, LTD., Osaka (JP); AUTONETWORKS TECHNOLOGIES, LTD., Mie (JP)

( * ) Notice: Subject to any disclaimer, the term of this patent is extended or adjusted under 35 U.S.C. 154(b) by 37 days.

(21) Appl. No.: 13/740,812

(22) Filed: Jan. 14, 2013

(65) Prior Publication Data

US 2013/0180777 A1 Jul. 18, 2013

(30) Foreign Application Priority Data

Jan. 17, 2012 (JP) ................................ 2012-006867

(51) Int. Cl.
*B60R 16/02* (2006.01)
*H02G 3/02* (2006.01)
*H02G 3/08* (2006.01)

(52) U.S. Cl.
CPC ............. *B60R 16/0215* (2013.01); *H02G 3/02* (2013.01); *H02G 3/083* (2013.01)

(58) Field of Classification Search
CPC .............. B60R 16/0215; H02B 1/202; B60K 2350/305; H02G 3/0437
See application file for complete search history.

(56) References Cited

U.S. PATENT DOCUMENTS 2,709,246 A * 5/1955 Abbott ................. H01R 4/2404
439/413
2,894,056 A * 7/1959 Bogese ..................... H01R 4/20
174/138 F (Continued)

FOREIGN PATENT DOCUMENTS

CN 1893211 A 1/2007
JP 2003-304621 A 10/2003

(Continued)

OTHER PUBLICATIONS

Oct. 26, 2015 Office Action issued in Chinese Patent Application No. 201310017730.8.

(Continued)

*Primary Examiner* — Adrian S Wilson
(74) *Attorney, Agent, or Firm* — Oliff PLC

(57) ABSTRACT

A wire harness including a wire fitting is provided that maintains the length of the portion of the wire bundle that extends to the outside of the wire fitting reliably at a tolerance range without impeding the freedom of bending the wire bundle. A wire harness includes a wire fitting having a base and a cover covering a portion of a wire bundle together with the base. The base is provided with a protrusion that pierces the insulated wires at a portion further to an outer edge of the base than a portion of the wire bundle that is tied together by a first tie member, the wire bundle extending from the base to an outside of the base.

11 Claims, 5 Drawing Sheets

(56) References Cited

U.S. PATENT DOCUMENTS

| | | | | |
|---|---|---|---|---|
| 3,194,279 A * | 7/1965 | Gerald | ............ | H01B 13/01227 235/117 A |
| 4,095,043 A * | 6/1978 | Martin | ............ | H01B 17/58 174/135 |
| 4,337,934 A * | 7/1982 | Caveney | ............ | B65B 13/18 248/68.1 |
| 4,356,599 A * | 11/1982 | Larson | ............ | F16L 3/12 24/16 PB |
| 4,766,651 A * | 8/1988 | Kobayashi | ............ | B60R 16/0215 24/16 PB |
| 4,815,984 A * | 3/1989 | Sugiyama | ............ | H02B 1/202 174/72 A |
| 4,864,082 A * | 9/1989 | Ono | ............ | H02G 3/0437 138/115 |
| 5,160,812 A * | 11/1992 | Takahashi | ............ | F16L 3/23 174/135 |
| 5,401,905 A * | 3/1995 | Lesser | ............ | H02G 3/26 138/108 |
| 5,534,665 A * | 7/1996 | Long | ............ | B60R 16/0215 174/68.1 |
| 5,811,732 A * | 9/1998 | Beam | ............ | H02G 3/00 174/72 A |
| 5,895,889 A * | 4/1999 | Uchida | ............ | B60R 16/0207 174/72 A |
| 5,932,846 A * | 8/1999 | Zaguskin | ............ | B60R 16/02 174/70 R |
| 6,031,182 A * | 2/2000 | Daoud | ............ | 174/651 |
| 6,070,307 A * | 6/2000 | Kawanabe | ............ | H05K 5/0247 174/53 |
| 6,076,315 A * | 6/2000 | Kondo | ............ | H02G 3/285 52/220.1 |
| 6,092,854 A * | 7/2000 | Campbell | ............ | B60R 13/02 180/90 |
| 6,250,706 B1 * | 6/2001 | Davis, Jr. | ............ | B60K 37/00 174/72 A |
| 6,294,736 B1 * | 9/2001 | Takeda | ............ | H02G 3/30 174/72 A |
| 6,444,912 B1 * | 9/2002 | Grossman | ............ | B60R 16/0215 174/135 |
| 6,464,181 B2 * | 10/2002 | Sakakura | ............ | F16L 3/23 24/16 PB |
| 6,674,004 B2 * | 1/2004 | Uchida | ............ | B60R 16/0215 174/135 |
| 7,017,615 B2 * | 3/2006 | Suzuki | ............ | B60R 16/0215 138/110 |
| 7,109,420 B2 * | 9/2006 | Arai | ............ | H02G 3/0487 174/481 |
| 7,118,410 B2 * | 10/2006 | Hatori | ............ | H01R 13/5833 439/501 |
| 7,301,101 B2 * | 11/2007 | Suzuki | ............ | H02G 3/30 174/117 F |
| 7,378,592 B2 * | 5/2008 | Suzuki | ............ | B60R 16/0215 174/135 |
| 7,507,906 B2 * | 3/2009 | Suzuki | ............ | H02G 3/32 174/117 F |
| 7,686,642 B2 * | 3/2010 | Pearson | ............ | H01R 4/183 439/423 |
| 8,188,368 B2 * | 5/2012 | Suzuki | ............ | B60R 16/0215 174/101 |
| 8,304,653 B2 * | 11/2012 | Suzuki | ............ | B60R 16/0215 174/68.1 |
| 8,575,487 B2 * | 11/2013 | Agusa | ............ | B60R 16/0215 174/68.3 |
| 2005/0106934 A1 | 5/2005 | Hatori | | |
| 2006/0219423 A1 | 10/2006 | Suzuki et al. | | |
| 2007/0007029 A1 | 1/2007 | Suzuki | | |
| 2010/0027232 A1 | 2/2010 | Kasuya et al. | | |
| 2010/0236826 A1 | 9/2010 | Suzuki | | |
| 2013/0146353 A1 * | 6/2013 | Shimada | ............ | B60R 16/0215 174/72 A |
| 2013/0146354 A1 * | 6/2013 | Shimada | ............ | H02G 3/0418 174/72 A |

FOREIGN PATENT DOCUMENTS

| | | |
|---|---|---|
| JP | A-2005-278307 | 10/2005 |
| JP | A-2010-018106 | 1/2010 |
| JP | A-2010-027242 | 2/2010 |
| JP | A-2010-036667 | 2/2010 |

OTHER PUBLICATIONS

Jul. 5, 2016 Office Action issued in Chinese Patent Application No. 201310017730.8.

* cited by examiner

WIRE HARNESS AND WIRE FITTING

CROSS-REFERENCE TO RELATED APPLICATIONS

This application is based on and claims priority under 35 USC 119 from Japanese Patent Application No. 2012-006867 filed Jan. 17, 2012.

TECHNICAL FIELD

The present invention relates to a wire fitting that holds wires in a predetermined shape as well as to a wire harness including the same.

BACKGROUND ART

Wire harnesses that are mounted to vehicles, such as automobiles or the like, often include a wire fitting made of resin attached to a wire bundle, and are laid out in a state in which the wire bundle is held along a predetermined path by the wire fitting. For example, in an ordinary conventional wire harness, the wire bundle is fastened to a plate-shaped or rod-shaped resin member by binder members such as adhesive tape or belt members. Thus, the wires are held in their predetermined shape.

Ordinary conventional wire harnesses require large tools such as drawing boards, a large number of resin members such as corrugated tubes, a large number of binder members for fastening the wires to the resin members, and a bothersome operation of attaching many components to the wires.

On the other hand, the wire harness disclosed in JP 2010-27242A includes a wire fitting made of two plate-shaped resin members that are fixed to each other by heat-pressing in a state in which they sandwich a wire bundle. One of the resin members is a base made of a flat plate-shaped base portion and ribs standing upright on the base portion. The other resin member is a flat plate-shaped cover, in which through holes are formed into which the ribs of the base are inserted, and which is fixed to a base portion of the base in a state in which it covers the base.

As disclosed in JP 2010-27242A, by employing such a wire fitting, the components and the operating process for holding the wire bundle of the wire harness in a predetermined shape are simplified.

Now, what is particularly important concerning the shape of wire harnesses is that the wires extend to a predetermined length from a predetermined position that is close to the connection counterpart. Here, the connection counterpart may be an electrical component or a connector or the like that is provided at the end of other wires.

For example, in a wire harness that is arranged below a seat of an automobile, it is important that an intermediate portion of the wires is fastened to a predetermined position leaving a predetermined length to the connector at the end or to the end of the wire bundle, so that a connector at the end of the wires reaches the component, such as a motor for driving the seat, or the connector provided at the end of the other wires at just the right length. For example, it is important that the length of the wire bundle extending to the outside of the wire fitting is held with a predetermined tolerance range.

On the other hand, it may be sufficient if, in the wire harness, the path of the wires up to the fastening position is accommodated within a given region with a relative wide range of tolerance. For example, in a wire harness arranged below the seat of an automobile, as long as the portion of the wires up to the fastening position is accommodated within a space between the seat and the component, such as the motor for driving the seat, then a layout over any path is allowable.

In the wire harness disclosed in JP 2010-27242A, the wire bundle is arranged between a plurality of ribs that protrude from a flat portion of the base, and is tied together with a tie member together with a wire fastening portion that protrudes outward at an outer edge of the base. Thus, the length of the wire bundle that extends to the outside of the wire fitting, that is, the length of the portion of the wire bundle from the location that is tied together by the wire fastening portion of the base to the terminal end portion is held at a constant length.

JP 2010-27242A is an example of related art.

However, if the wire fitting of JP 2010-27242A is employed, it is difficult to tie the wire bundle and the flat plate-shaped wire fastening portion together tightly with the tie member, and the tying of the wire bundle and the wire fastening portion loosens easily. Therefore, the problem tends to occur that the wire bundle is pulled out of the wire fitting beyond the tolerance range. Moreover, if the wire fastening portion is formed to be long in order to widen the tie region of the wire bundle and the wire fastening portion and to strengthen the tying force, then the freedom of bending the wire bundle is severely limited.

SUMMARY OF THE INVENTION

It is an object of the present invention to provide a wire harness including a wire fitting, with which the length of a portion of the wire bundle that extends to the outside of the wire fitting can be maintained reliably within a tolerance range, without impeding the freedom of bending the wire bundle.

A wire harness according to a first aspect of the invention includes the following structural features:
(1) The first structural feature is a wire bundle made of a plurality of wires.
(2) The second structural feature is a wire fitting including a base that supports a portion of the wire bundle from one side and a cover that is assembled to the base and that covers the portion of the wire bundle together with the base.
(3) The third structural feature is a first tie member that ties a portion of the wire bundle together.
(4) The fourth structural feature is a protrusion that is formed protruding from a surface of the base of the wire fitting, the surface facing the cover, the protrusion piercing the wires at a portion located further to an outer edge of the base than the portion of the wire bundle that is tied together by the first tie member, the wire bundle extending from the base to an outside of the base.

A wire harness according to a second aspect of the invention is one aspect of the wire harness according to the first aspect. The wire harness according to the second aspect further includes a hole portion that is formed in the cover of the wire fitting at a position opposing the protrusion of the base, and into which a tip of the protrusion piercing the wire bundle is inserted.

A wire harness according to a third aspect of the invention is one aspect of the wire harness according to the second aspect. In the wire harness according to the third aspect, the hole portion of the cover of the wire fitting is a portion in which a through hole is formed into which the tip of the protrusion is inserted.

A wire harness according to a fourth aspect of the invention is one aspect of the wire harness according to any of the first to third aspects. The wire harness according to the fourth aspect further includes a second tie member that ties the wire bundle pierced by the protrusion together at a location further outside than the protrusion of the base.

A wire harness according to a fifth aspect of the invention is one aspect of the wire harness according to any of the first to fourth aspects. In the wire harness according to the fifth aspect, the base and the cover of the wire fitting are members obtained by vacuum-molding flat plate-shaped resin members.

The present invention may also be regarded to reside in a wire fitting included in a wire harness according to any of these aspects of the invention.

In the first aspect, if a tensional force is applied to the wire bundle, then the portion of the wire bundle that is bundled together by the first tie member is pulled against the protrusion of the base. And if the wire bundle is pulled against the protrusion of the base, then a force that attempts to widen the wire bundle toward the outside acts from the protrusion on the wire bundle. Furthermore, the first tie member, which ties only the wire bundle together, is tied firmly to the wire bundle. Thus, there is hardly any loosening of the tying of the wire bundle. Consequently, the problem that the wire bundle is pulled too far from the wire fitting to the outside does not occur.

Moreover, the wire fitting of the first aspect does not require that wire fastening portions that are tied together with the wire bundle are formed at the outer edge, as in conventional wire fittings. Therefore, the freedom of bending the wire bundle is not impeded. Furthermore, by omitting the wire fastening portions protruding to the outside, the wire fitting can be made more compact (saving space).

Consequently, with the first aspect, a wire harness including a wire fitting can be provided, with which the length of a portion of the wire bundle that extends to the outside of the wire fitting can be maintained reliably within a tolerance range, without impeding the freedom of bending the wire bundle.

In accordance with the second aspect, it can be prevented that the wire bundle comes off from the protrusion of the base of the wire fitting, that is, it can be prevented that the protrusion of the base is pulled out from the wire bundle.

Moreover, in accordance with the third aspect, it can be confirmed whether the protrusion of the base completely pierces the wire bundle, in a state in which the base and the cover are assembled together. Therefore, an insufficient layout can be prevented in which the wires are wedged between the protrusions of the base and the cover.

Moreover, in accordance with the fourth aspect, if a force pushing the wire bundle into the wire fitting is applied to the wire bundle, then the portion of the wire bundle that is bundled together by the second tie member is pulled against the protrusion of the base. Moreover, as explained above, if a tensional force is applied to the wire bundle, then the portion of the wire bundle that is bundled together by the first tie member is pulled against the protrusion of the base. Consequently, with the fourth aspect, it can be prevented that the wire bundle protrudes too far out from the wire fitting as well as that the wire bundle is pushed too far into the wire fitting.

Consequently, the fourth aspect is preferable in cases in which the length for which the wire bundle extends from the wire fitting is to be maintained at a constant length. In such cases, the two locations of the wire bundle near both sides of the portion where the protrusion pierces the wire bundle are respectively tied together by the first tie member and the second tie member. The fourth aspect is also preferable in cases in which the length by which the wire bundle extends from the wire fitting is to be made adjustable within a predetermined range. In such a case, the first tie member and the second tie member may be tied together at two locations at a distance corresponding to the length adjustment range of the wire bundle.

Generally, members obtained by vacuum-molding flat plate-shaped members can be manufactured more easily and at lower cost than members that are obtained by injection molding of resin. Consequently, with the fifth aspect, the manufacturing hours and manufacturing costs for the wire fitting can be reduced. It should be noted that the flat plate-shaped base including the ribs disclosed in JP 2010-27242A cannot be obtained by vacuum-molding a flat plate-shaped member.

EMBODIMENTS OF THE INVENTION

Figure 1:
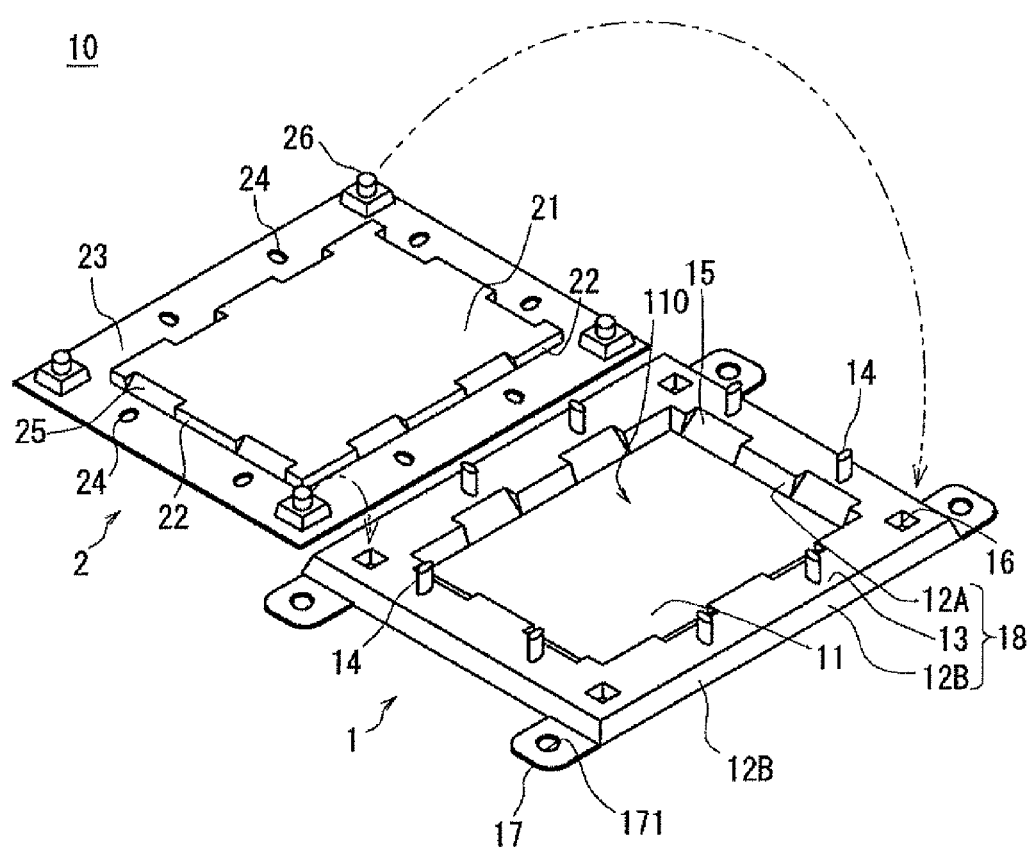
FIG. 1 is a perspective view of a wire fitting 10 according to an embodiment of the invention.

The following is a description of embodiments of the invention, with reference to the accompanying drawings. The following embodiments are merely examples for working the invention, and are not meant to limit the technical scope of the invention.

General Configuration

First, the configuration of a wire fitting 10 in accordance with an embodiment of the present invention and a wire harness 100 in accordance with an embodiment of the present invention is explained with reference to FIGS. 1 to 3.

The wire harness 100 includes a wire bundle 90 made up of a plurality of insulated wires 9, tie members 8 tying the wire bundle 90 together, and the wire fitting 10 to which the wire bundle 90 is attached.

Wire Bundle

The insulated wires 9 constituting the wire bundle 90 are each constituted by a core wire made of a conductive material and an insulation coating made of an insulating material that covers the core wire. The wire harness 100 is attached, for example, in a space below the seats in a vehicle, a space behind the ceiling or in a trunk room or the like, and is connected to other wires or electric devices around it. For this reason, the wire bundle 90 of the wire harness 100 is a wire bundle with a connector that includes a plurality of insulated wires 9 and connectors 91 that are attached to ends of these insulated wires 9.

In the wire harness 100, the wire bundle 90 is bundled together by the wire fitting 10 while being held in a predetermined shape. For this reason, the wire harness 100 can be easily attached to a through hole portion of a supporting body using a holding device.

Tie Members

The tie members 8 are members for tying together portions of the wire bundle 90, which extends from a base 1 of the wire fitting 10 to the outside of the base 1. The tie members 8 are components that are separate from the wire fitting 10 and may be adhesive tapes or tie belts or the like. In the present embodiment, the wire bundle 90 is tied together by the tie members 8 at two locations at each of the portions arranged extending from the base 1 to the outside of the base 1.

In the foregoing explanations, the tie members 8 tying together the portions of the wire bundle 90 on the inside of the base 1 with respect to the portion crossing over the outer edge of the base 1 are referred to as "first tie members 81." And the tie members 8 tying together the portions of the wire bundle 90 on the outside of the base 1 with respect to the portion crossing over the outer edge of the base 1 are referred to as "second tie members 82."

Wire Fitting

Figure 2:
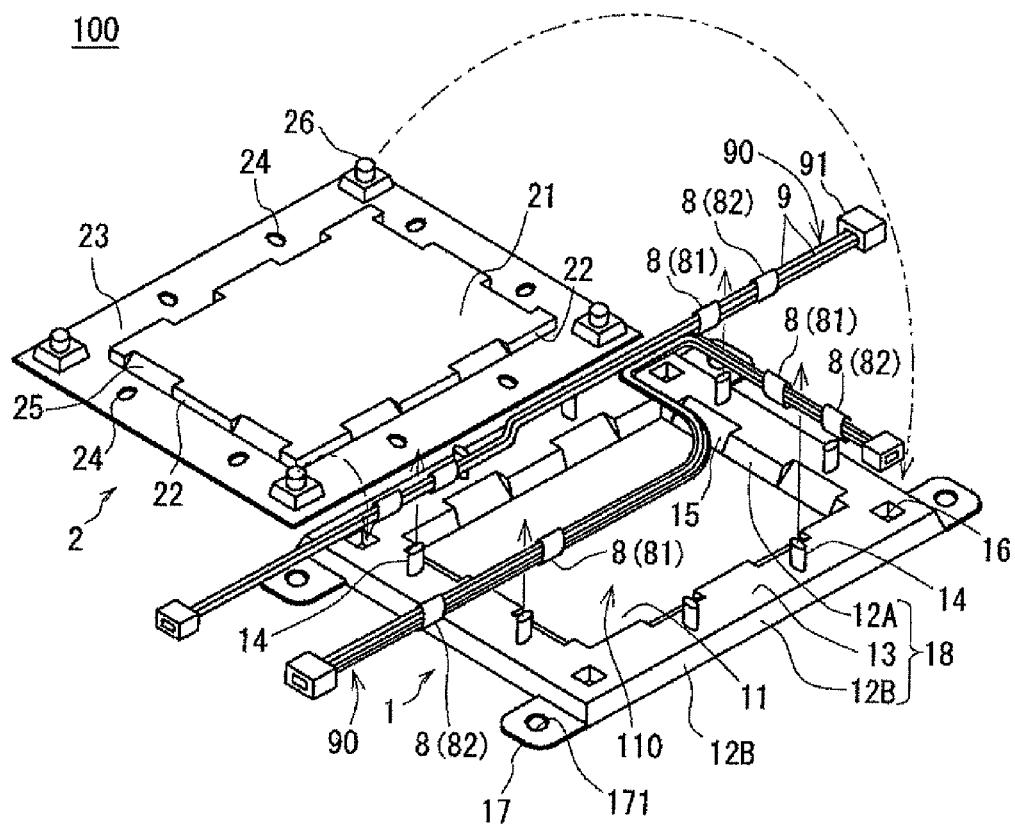
FIG. 2 is an unfolded perspective view of a wire harness 100 according to an embodiment of the invention.
Figure 3:
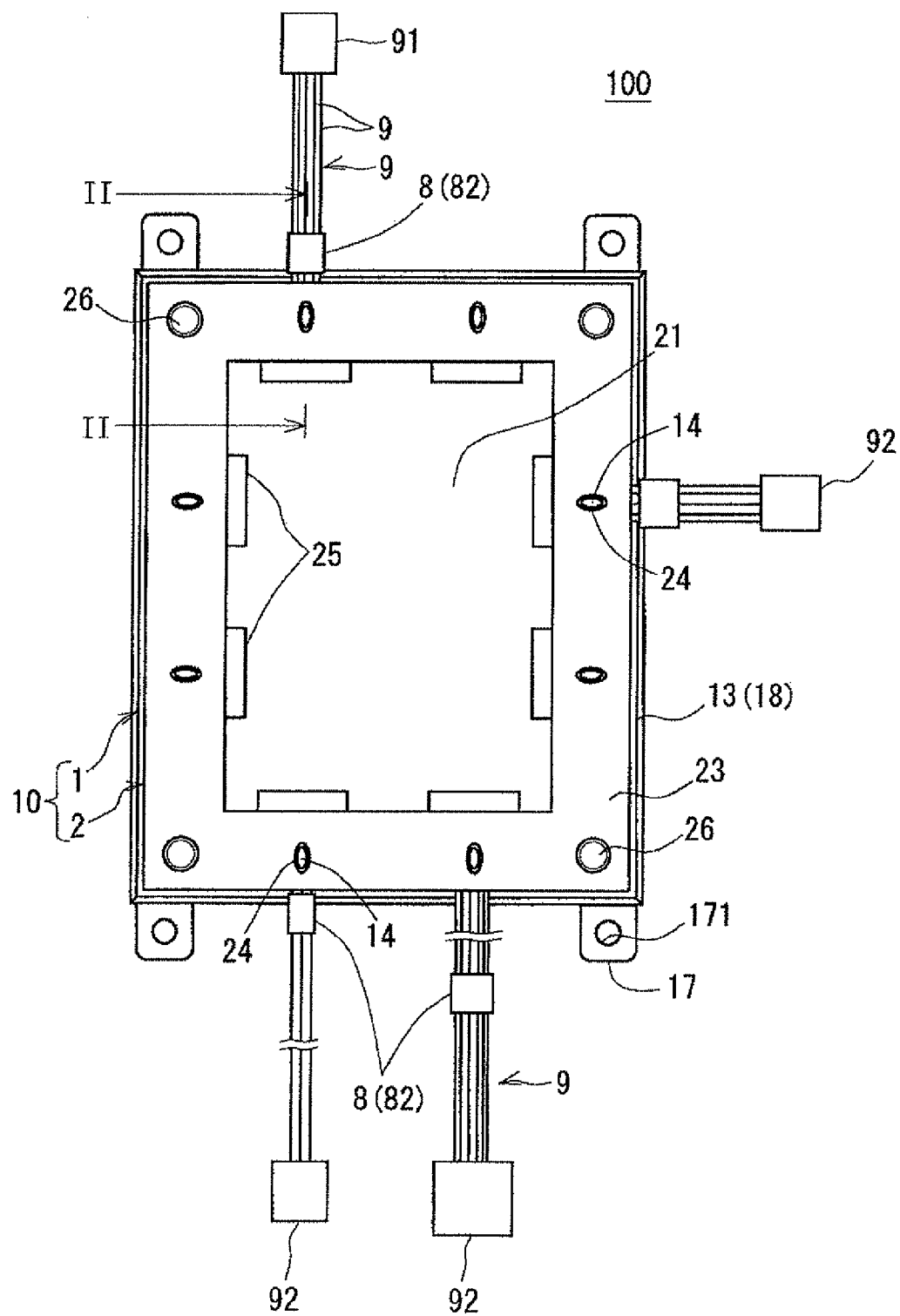
FIG. 3 is a top view of the wire harness 100.

As shown in FIGS. 1 to 3, the wire fitting 10 is constituted by a base 1 and a cover 2 that is laid over the base. The cover 2 is assembled to the base 1 after tucking a mid portion of the wire bundle 90 between the base 1 and the cover 2.

The base 1 and the cover 2 are fixed to each other in a state in which the wire bundle 90 is tucked in between them, and thus, the wire fitting 10 holds the wire bundle 90 tucked between the base 1 and the cover 2 in its predetermined shape.

In the present embodiment, the wire fitting 10 is a member that can be obtained by vacuum molding a plate-shaped resin member. The wire fitting 10 may be a resin member made of, for example, polypropylene (PP), polyethylene (PE), polyvinylchloride (PVC), polyethylene-terephthalate (PET), polyimide (PA) or the like.

Moreover, if the base 1 and the cover 2 are obtained by vacuum molding, then, depending on the application, polyvinylchloride (PVC), which has superior fire retardancy, polypropylene (PP), which has superior stretchability, or polyethylene-terephthalate (PET), which has superior rigidity, are preferable as the resin material constituting the base 1 and the cover 2. These resin materials are all materials that can be obtained easily and at low cost.

Wire Fitting: Base

The base 1 constituting the wire fitting 10 supports a portion of the wire bundle 90 from one side and is made by molding a resin member into an uneven plate-shape. As noted above, the base 1 in the present embodiment is obtained by vacuum-molding a flat plate-shaped resin member. As shown in FIG. 1, the base 1 includes a wiring portion 11, a first outer frame portion 18, and fastening ear portions 17.

The wiring portion 11 constituting the base 1 is a plate-shaped portion facing a wiring space 110 in which the mid portion of the wire bundle 90 is arranged, and can be regarded as a bottom plate portion forming a bottom face of the base 1.

The wiring portion 11 shown in FIGS. 1 and 2 is flat and plate-shaped, but may also be plate-shaped with a plurality of reinforcement protrusions or recesses. It should be noted that the base 1 has an uneven plate shape, so that in the base 1, the reinforcement protrusions on the side of the wiring space 110 are recesses on the side opposite to that of the wiring space 110. Moreover, in the base 1, the reinforcement recesses on the side of the wiring space 110 are protrusions on the side opposite to that of the wiring space 110. However, the reinforcement protrusions are formed with a height that is lower than the height of a first step portion 12A on an inner edge side, which is explained later.

The first outer frame portion 18 constituting the base 1 is a portion that is formed to be projecting around the wiring space 110 above the wiring portion 11, and forms an outer frame of the base 1. As shown in FIGS. 1 and 2, the first outer frame portion 18 includes the first step portion 12A on the inner edge side, an intermediate plate portion 13 and a first step portion 12B on an outer edge side.

The first step portion 12A on the inner edge side of the first outer frame portion 18 is a step portion at the inner edge that rises from the wiring portion 11 along the outer edge of the wiring portion 11, which forms the bottom plate. Moreover, the intermediate plate portion 13 of the first outer frame portion 18 is a plate-shaped portion that protrudes to the outer side from the first step portion 12A on the inner edge side. On the intermediate plate portion 13, a plurality of protrusions 14 for locking the plurality of wires are formed.

The protrusions 14 are formed protruding from the surface of the base 1 on the side of the cover 2, that is, the surface on the side that supports the wire bundle 90. It should be noted that since the base 1 has an uneven plate-shape, the protrusions 14 project towards the side of the cover 2, but on the side opposite to the cover 2, they are recesses.

The protrusions 14 constitute a structure for locking the wire bundle that holds the length of a portion the wire bundle 90 extending outward of the base 1 within a tolerance range. Details of the protrusions 14 and the structure for locking the wire bundle are explained further below.

Moreover, the first step portion 12B on the outer edge side of the first outer frame portion 18 is a step portion at the outer edge that is formed along the outer edge of the intermediate plate portion 13. The first outer frame portion 18 rises above the wiring portion 11 for a height that corresponds to the height of the first step portion 12A on the inner edge side and the first step portion 12B on the outer edge side.

In the present embodiment, the protrusions 14 are distributed along the four edges of the rectangular first outer frame portion 18, which encloses the rectangular wiring portion 11 from four sides. That is to say, in the present embodiment, the protrusions 14 are formed lining up over a range that encloses the four sides of the perimeter of the wiring portion 11.

It should be noted that if the wiring portion 11 has a polygonal shape other than a rectangle, and the first outer frame portion 18 has a polygonal shape that encloses the polygonal wiring portion 11 from all sides corresponding to its edges, then the protrusions 14 may be distributed along all edges of the polygonal first outer frame portion 18.

In the example shown in FIG. 1, the first step portion 12A on the inner edge side and the first step portion 12B on the outer edge side are formed with an overall constant height, but it is also possible that the step portions include some portions that are higher than other portions.

Instead of being provided with a flat plate shape, the intermediate plate portion 13 constituting the first outer frame portion 18 may be provided with a shape that mixes flat portions with recesses or protrusions. In the example shown in FIG. 1, the intermediate plate portion 13 is provided with a shape that mixes flat portions with recesses.

As shown in FIG. 1, parts of the intermediate plate portion 13 of the first outer frame portion 18 are provided with recesses 16 for preliminary fixing.

Moreover, the fastening ear portions 17 are plate-shaped portions that protrude further outward from the first outer frame portion 18. The fastening ear portions 17 are provided with through holes 171 for fastening the wire fitting.

Holding devices are passed through the through holes 171 for fastening the wire fitting when the wire fitting 10 is attached to a support, such as a panel of an automobile. By passing the holding devices through the through holes 171 for fastening the wire fitting of the base 1 and attachment holes formed in the support member, the wire fitting 10 can be fastened to the support member.

Moreover, the first step portion 12A on the inner edge side of the first outer frame portion 18 of the base 1 is provided with a plurality of wire grooves 15, which are groove-shaped portions that serve as pathways for the insulated wires 9 that extend from the wiring portion 11 to the plurality of protrusions 14.

Wire Fitting: Cover

The cover 2 constituting the wire fitting 10 is made of a resin member molded into an uneven plate shape. By assembling it to the base 1, this cover 2 covers the wiring space 110 on the wiring portion 11 of the base 1. That is to say, the cover 2 is assembled to the base 1 and covers a portion of the wire bundle 90 together with the base 1. As noted above, like the base 1, the cover 2 in the present embodiment is obtained by vacuum-molding a flat plate-shaped resin member.

As shown in FIGS. 1 and 2, the cover 2 includes an opposing wall portion 21, a second step portion 22 and a second outer frame portion 23. Furthermore, the cover 2 also includes a plurality of hole portions 24 and a plurality of preliminary fixing protrusions 26 that are formed in parts of the second outer frame portion 23.

In the following explanations, it is assumed that, if explained in relation to the base 1, the position or shape of the constituent elements of the cover 2 is such that the cover 2 is assembled covering the base 1.

The opposing wall portion 21 constituting the cover 2 opposes the wiring portion 11 of the base 1 across the wiring space 110. The opposing wall portion 21 of the present embodiment is provided with an overall flat plate shape. However, like the wiring portion 11 of the base 1, the opposing wall portion 21 may also have a plate shape in which a plurality of reinforcement protrusions or recesses are formed.

The second step portion 22 constituting the cover 2 is formed along the outer edge of the opposing wall portion 21 and is raised from the opposing wall portion 21 to the side opposite to that of the base 1, forming a step. In other words, all of the opposing wall portion 21 and the second step portion 22 in the cover 2 is formed protruding towards the base 1. However, it is also possible that all of the opposing wall portion 21 and the second step portion 22 of the cover 2 is formed protruding to the side opposite to that of the base 1.

The second outer frame portion 23 forming part of the cover 2 is formed along the outer edge of the second step portion 22 and constitutes the outer edge portion of the cover 2. The second outer frame portion 23 may have a flat plate shape, but it is also possible that it has a shape in which recesses or protrusions are mixed with flat portions. In the example shown in FIG. 1, parts of the second outer frame portion 23 are provided with the plurality of hole portions 24 and a plurality of preliminary fixing protrusions 26.

The plurality of hole portions 24 are formed at positions of the cover 2 that oppose the protrusions 14 of the base 1, when the cover 2 is assembled to the base 1. In the present embodiment, the hole portions 24 are formed as through holes into which the tips of the protrusions 14 of the base 1 can be inserted.

Moreover, the preliminary fixing protrusions 26 protrude toward the base 1 and are formed at positions that oppose the preliminary fixing recesses 16 of the base 1. The hole portions 24 and the preliminary fixing protrusions 26 formed in the cover 2 are explained further below.

Moreover, at positions in the second step portion 22 of the cover 2 that oppose the plurality of wire grooves 15 formed in the first step portion 12A on the inner edge side of the base 1, a plurality of wire grooves 25 are formed, which are groove-shaped portions that, together with the wire grooves 15, serve as pathways for the insulated wires 9 that extend from the wiring portion 11 to the plurality of protrusions 14.

Preliminary Fixing Mechanism

Parts of the intermediate plate portion 13 in first outer frame portion 18 of the base 1 are provided with preliminary fixing recesses 16. In the example shown in FIGS. 1 and 2, four preliminary fixing recesses 16 are formed at the four corners of the intermediate plate portion 13 of the first outer frame portion 18. The preliminary fixing recesses 16 form indentations that are open toward the cover 2.

On the other hand, parts of the second outer frame portion 23 of the cover 2 are provided with preliminary fixing protrusions 26 that respectively fit into the preliminary fixing recesses 16 of the base 1. In the example shown in FIGS. 1 and 2, the four preliminary fixing protrusions 26 are respectively formed at positions opposing the four preliminary fixing recesses 16.

In the wire fitting 10, the preliminary fixing recesses 16 formed in parts of the base 1 and the preliminary fixing protrusions 26 formed in parts of the cover 2 constitute a preliminary fixing mechanism for fixing the cover 2 to the base 1.

The outer shape of the side walls of the preliminary fixing protrusions 26 is formed to a shape that is inscribed by the inner walls of the preliminary fixing recesses 16 when slightly compressed. Thus, when the preliminary fixing protrusions 26 are pushed into the preliminary fixing recesses 16, the cover 2 is fixed with respect to the base 1 in a state in which it covers the wiring portion 11 of the base 1, due to the friction resistance between the side walls of the preliminary fixing protrusions 26 and the inner walls of the preliminary fixing recesses 16.

As has been shown above, the preliminary fixing recesses 16 and the preliminary fixing protrusions 26 constitute a preliminary fixing mechanism that fixes the cover 2 to the base 1 in a state in which the cover 2 covers the wiring portion 11, through a structure in which protrusions are fitted into recesses.

In the example shown in FIG. 1, the preliminary fixing recesses 16 are provided on the side of the base 1, and the preliminary fixing protrusions 26 are provided on the side of the cover 2, but the converse configuration is also possible. That is to say, the preliminary fixing recesses 16 may be provided on the side of the cover 2, and the preliminary fixing protrusions 26 may be provided on the side of the base 1. It is also possible to mix the preliminary fixing recesses 16 and the preliminary fixing protrusions 26 in the base 1 and the cover 2.

Moreover, in the present embodiment, the portions where the preliminary fixing recesses 16 and the preliminary fixing protrusions 26 are in contact with each other are welded by a compact spot-heating device, such as by a ultrasound welding device, fixing the cover 2 to the base 1. Thus, the cover 2 is assembled to the base 1 and is held in a state in which the mid portion of the wire bundle 90 is tucked between the base 1 and the cover 2.

For example, when the preliminary fixing protrusions 26 are fitted into the preliminary fixing recesses 16, the bottom surfaces of the indentations in the preliminary fixing recesses 16 may be in contact with the top surfaces of the preliminary fixing protrusions 26. In this case, welding portions are formed at the portions where the bottom surfaces of the preliminary fixing recesses 16 are in contact with the top surfaces of the preliminary fixing protrusions 26.

Wire Harness

As shown in FIGS. 2 and 3, the wire harness 100 includes a wire bundle 90 made of a plurality of insulated wires 9, first tie members 81 and second tie members 82, and the wire fitting 10.

In the wire harness 100, the mid portion of the wire bundle 90 is arranged in the wiring space 110 on the wiring portion 11 of the base 1. Moreover, a connector 91 at the end of the wire bundle 90 is disposed outside the base 1.

Structure for Locking the Wire Bundle

Next, the structure for locking the wire bundle 90 in the wire fitting 10 is explained with reference to FIGS. 3 to 5. The structure for locking the wire bundle 90 holds the length of a portion of the wire bundle 90 that extends from the wire fitting 10 to the outside thereof to a tolerance range by catching a part of the wire bundle 90 with the protrusions 14 of the base 1.

Figure 4:
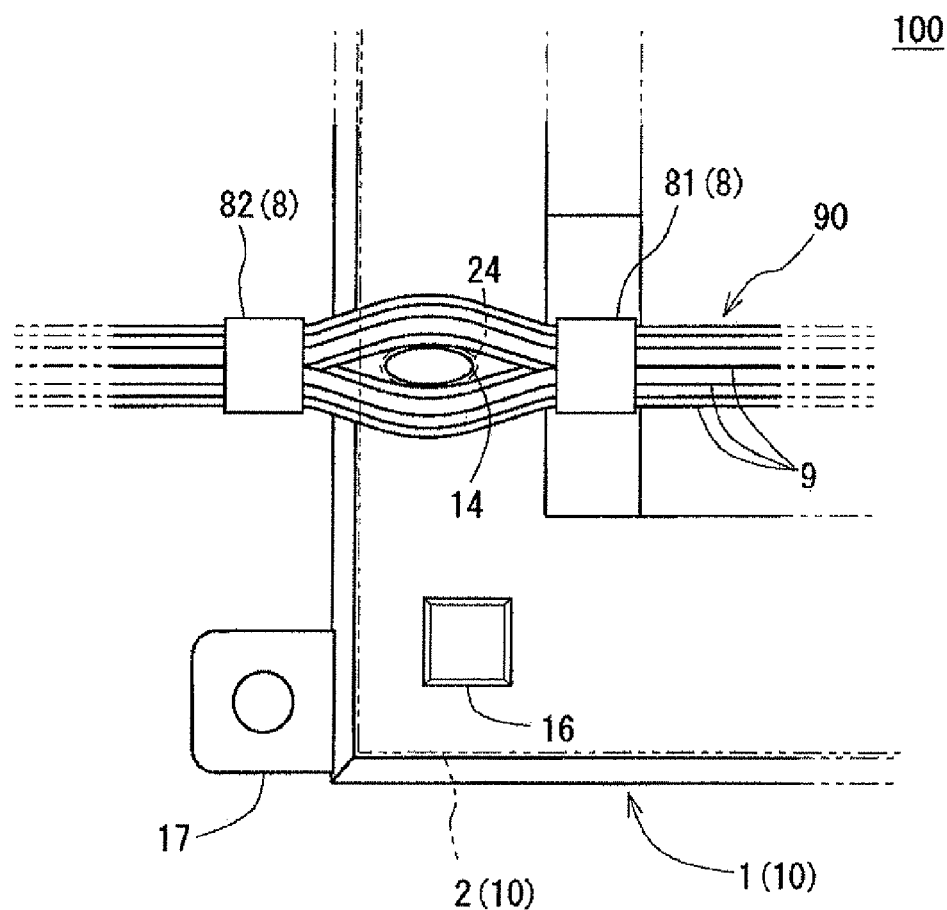
FIG. 4 is a top view of a structure for locking the wire bundle in the wire fitting 10 of the wire harness 100.
Figure 5:
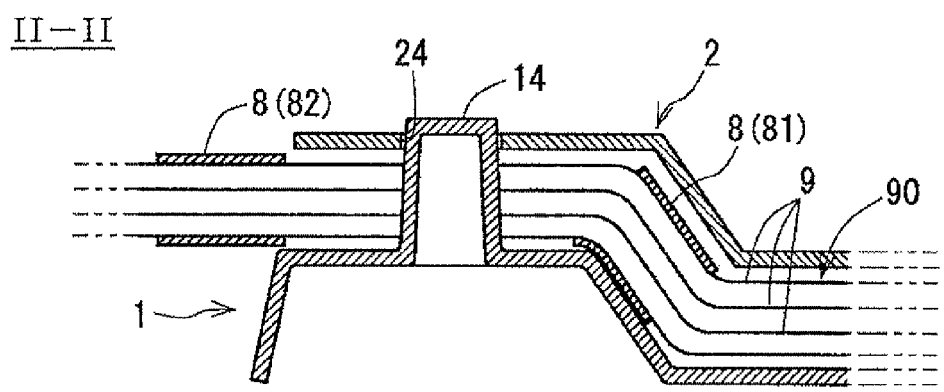
FIG. 5 is a cross-sectional view of a structure for locking the wire bundle in the wire fitting 10 of the wire harness 100.

FIGS. 4 and 5 are a top view and a cross-sectional view of the structure for locking the wire bundle in the wire fitting 10 of the wire harness 100. It should be noted that in FIG. 4, the cover 2 is drawn with phantom lines (dash-dot-dot lines). Also, FIG. 5 is a cross-sectional view along the plane II-II in FIG. 3.

As shown in FIG. 3, in the wire harness 100, the wire bundle 90 is arranged so that it extends from the wiring portion 11 of the base 1 through the portion of the protrusions 14 on the first outer frame portion 18 to the outside of the first outer frame portion 18.

Moreover, as shown in FIGS. 4 and 5, one of the protrusions 14 of the base 1 pierces through an intermediate position of the wire bundle 90, leaving a predetermined length to the connector 91 at the end of the wire bundle 90, and the tip of that protrusion 14 is inserted into the hole portions 24 of the cover 2. More specifically, the protrusion 14 pierces through the insulated wires 9 at a portion that is located further to the outer edge of the base 1 than the portion of the wire bundle 90 that extends from the base 1 to the outside of the base 1 and is tied together by the first tie member 81.

Moreover, the second tie member 82 ties the wire bundle 90 pierced by the protrusion 14 of the base 1 together at a location that is further outside than the protrusion 14 of the base 1. That is to say, the protrusion 14 of the base 1 pierces a portion that is between the portion of the wire bundle 90 that is tied together by the first tie member 81 and the portion of the wire bundle 90 that is tied together by the second tie member 82.

In the example shown in FIG. 3, the number of protrusions 14 formed lining up on the first outer frame portion 18 of the base 1 is larger than the number of portions of the wire bundle 90 that extend from the wire fitting 10 to the outside of the wire fitting 10. That is to say, in the example shown in FIG. 3, some of the plurality of protrusions 14 are in an unused state.

Figure 6:
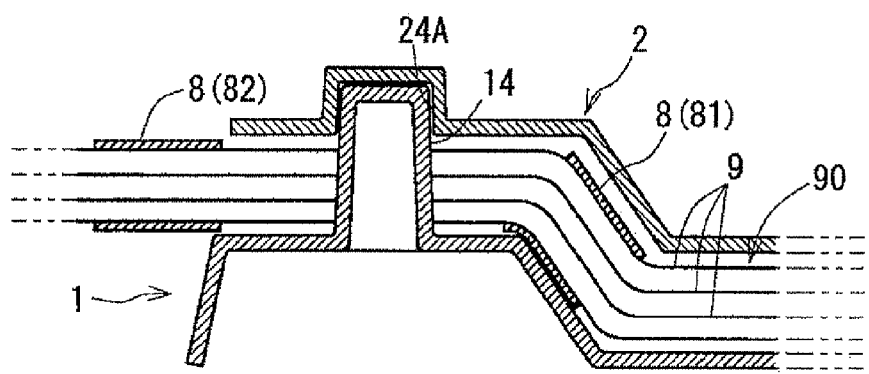
FIG. 6 is a cross-sectional view of the structure for locking the wire bundle according to an application example of the wire fitting 10 of the wire harness 100.

Next, a structure for locking the wire bundle 90 according to an application example is explained with reference to FIG. 6. FIG. 6 is a cross-sectional view of the structure for locking the wire bundle according to an application example of the wire fitting 10 of the wire harness 100, and corresponds to the cross-sectional view of FIG. 5.

In this application example, hole portions 24A forming recesses on the side of the base 1 are formed in the cover 2 instead of the hole portions 24 formed as through holes.

Like the hole portions 24, the hole portions 24A in the cover 2 are formed at positions of the cover 2 that correspond to the protrusions 14 of the base 1, and are portions through which the tips of the protrusions 14 piercing the wire bundle 90 are inserted.

In this application example, the portions where the protrusions 14 and the hole portion 24A are in contact with each other, are welded by a compact spot-heating device, such as an ultrasound welding device.

Effect

If a tensional force is applied to the wire bundle 90 of the wire harness 100, then the portion of the wire bundle 90 that is bundled together by the first tie member 81 is pulled against the protrusion 14 of the base 1. Also, if the wire bundle 90 is pulled against the protrusion 14 of the base 1, a force that attempts to widen the wire bundle 90 toward the outside acts from the protrusion 14 on the wire bundle 90. Furthermore, the first tie member 81, which ties only the wire bundle 90 together, is tied firmly to the wire bundle 90. Thus, there is hardly any loosening of the tying of the wire bundle 90. Consequently, the problem that the wire bundle 90 is pulled too far from the wire fitting 10 to the outside does not occur.

Consequently, the shape of the wire bundle 90 is held by the wire fitting 10 in such a manner that the terminal end of the wire bundle 90 reaches its connection counterpart at just the right length. Moreover, the mid portion of the wire bundle 90 is protected by the base 1 and the cover 2.

Also, it is not necessary that the wire fitting 10 is provided on its outer edge with wire fastening portions, with which the wire bundle 90 can be tied together, as in conventional wire fittings. Therefore, the freedom of bending the wire bundle 90 is not impeded. Furthermore, by omitting the wire fastening portions that protrude to the outside, the wire fitting 10 requires a smaller surface area for wiring than conventionally.

Consequently, by employing the wire harness 100, the length of the portion of the wire bundle 90 that extends to the outside of the wire fitting 10 can be maintained reliably at a tolerance range without impeding the freedom of bending the wire bundle 90.

Moreover, the wire fitting 10 has a structure in which the tip of the protrusions 14 of the base 1 is inserted into the hole portions 24 or 24A of the cover 2. Therefore, it can be prevented that the wire bundle 90 comes off from the protrusions 14 of the base 1, that is, it can be prevented that the protrusions 14 of the base 1 are pulled out of the wire bundle 90.

Moreover, if the hole portions 24 forming through holes in the cover 2 are employed, then it is easy to confirm, in the state in which the base 1 and the cover 2 are assembled together, whether the protrusions 14 of the base 1 completely pierce the wire bundle 90. Therefore, an insufficient layout is prevented in which the insulated wires 9 are wedged between the protrusions 14 of the base 1 and the cover 2.

On the other hand, if the hole portions 24A forming recesses in the cover 2 are employed, then, by welding the protrusions 14 of the base 1 to the hole portions 24A of the cover 2, it can be more reliably prevented that the protrusions 14 of the base 1 are pulled out of the wire bundle 90.

Moreover, in the wire harness 100, the portion of the wire bundle 90 that is located further to the terminal end side than the portion that is pierced by the protrusions 14 is tied together by the second tie member 82. Thus, if a force pushing the wire bundle 90 into the wire fitting 10 is applied to the wire bundle 90, then the portion of the wire bundle 90 that is bundled together by the second tie member 82 is pulled against the protrusion 14 of the base 1. Moreover, as explained above, if a tensional force is applied to the wire bundle 90, then the portion of the wire bundle 90 that is bundled together by the first tie member 81 is pulled against the protrusion 14 of the base 1. Consequently, by employing the wire harness 100, it can be prevented that the wire bundle 90 protrudes too far out from the wire fitting 10 as well as that the wire bundle 90 is pushed too far into the wire fitting 10.

The structure in which the wire bundle 90 is tied together on both sides of the protrusion 14 is preferable in cases in which the length for which the wire bundle 90 extends from the wire fitting 10 is to be maintained at a constant length. In such cases, the two locations of the wire bundle 90 near both sides of the portion where the protrusion 14 pierces the wire bundle 90 are respectively tied together by the first tie member 81 and the second tie member 82.

The structure in which the wire bundle 90 is tied together on both sides of the protrusion 14 is also preferable in cases in which the length by which the wire bundle 90 extends from the wire fitting 10 is to be made adjustable within a predetermined range. In such a case, the first tie member 81 and the second tie member 82 may be tied together at two locations at a distance corresponding to the length adjustment range of the wire bundle 90.

Moreover, members obtained by vacuum-molding flat plate-shaped members can ordinarily be manufactured more easily and at lower cost than members obtained by resin injection molding. The wire fitting 10 is a member that is obtained by vacuum-molding a flat plate-shaped member, so that the manufacturing time and manufacturing costs are reduced.

Moreover, in the example shown in FIG. 4, the width of the protrusion 14 in a first direction from the inside of the base 1 to the outside thereof is set to be smaller than the width of the protrusion 14 in a second direction along the outer edge of the base 1. More specifically, the protrusion 14 shown in FIG. 4 is provided with the shape of an elliptical column whose major axis direction coincides with the first direction. If protrusions 14 with such a shape are employed, then the angle by which the wire bundle 90 is branched to both sides of the protrusion 14 becomes relatively small. As a result, it can be avoided that an excessive force pushing the wire tie 8 open with the wire bundle 90 when a force pulling the wire bundle 90 out of the wire fitting 10 or a force pushing the wire bundle 90 into the wire fitting 10 is applied to the wire bundle 90.

On the other hand, if the width of the protrusion 14 in the first direction is formed to be large, then the effect of maintaining the position of the wire bundle 90 by the tied portion of the wire bundle 90 being caught by the protrusion 14 becomes more pronounced. Consequently, depending on the application, various shapes may be employed for the shape of the protrusion 14. For example, it is also possible that the protrusion 14 has the shape of a circular column.

However, in order to prevent that the protrusion 14 damages the insulated wires 9, it is desirable that the lateral face of the protrusion 14 is a smooth surface without any corners.

Moreover, in the wire harness 100, the portion of the wire bundle 90 that is arranged on the wiring portion 11 of the base 1, that is, the mid portion up to the first outer frame portion 18 of the base 1 is accommodated inside the large wiring space 110 between the wiring portion 11 of the base 1 and the cover 2.

Consequently, in the operation of laying out the wire bundle 90 on the wiring portion 11 of the base 1, the wire bundle 90 can be laid out in arbitrary paths on the wiring portion 11, and even if the wire bundle 90 is lifted up from the wiring portion 11, the wire bundle 90 can be accommodated within the wiring space 110 between the wiring portion 11 of the base 1 and the cover 2 simply by pushing the cover 2 onto the base 1. That is to say, a bothersome operation of laying out the wire bundle 90 while pushing the wire bundle 90 lifted up from the wiring portion 11 of the base 1 into the wiring portion 11 is not necessary.

Consequently, by employing the wire fitting 10, the structure and the operation for holding the wire bundle 90 in a predetermined shape as well as the structure and the operation for covering the portion of the wire bundle 90 to be protected (intermediate portion) can be simplified.

Moreover, in the first outer frame portion 18 of the base 1, the first step portion 12A on the inner edge side and the first step portion 12B on the outer edge side function as reinforcements that increase the rigidity of the overall base 1, and in particular the rigidity of the first outer frame portion 18. In the wire harness 100, the protrusions 14 holding the position of the wire bundle 90 are formed on the first outer frame portion 18 of the base 1 with such high rigidity. For this reason, the wire fitting 10 of the wire harness 100 is superior in its performance (rigidity) of holding the wire bundle 90 in a constant shape.

Furthermore, in the wire harness 100, at least the same number of protrusions 14 as there are branches in the wire bundle 90 where the wire bundle 90 is guided from the wire fitting 10 to the outside thereof are formed lining up in rows in the first outer frame portion 18 of the base 1. Therefore, the positions where the wire bundle 90 extends out of the wire fitting 10 can be selected from a plurality of positions prepared in advance in accordance with the required specifications. Consequently, the wire fitting 10 is superior in its ability to be adapted to a variety of required specifications.

FURTHER CONSIDERATIONS

If, in the wire harness 100, there is no particular limitation to the length of the portion of the wire bundle 90 that can be pushed into the wire fitting 10, then it is also possible to omit the second tie member 82.

It is also possible that the base 1 and the cover 2 of the wire fitting 10 are members that are obtained by resin injection molding. The base 1 and the cover 2 shown in this embodiment are members that are molded in a plate-shape that is uneven only with respect to a single dimension. Such a member can be easily obtained by vacuum-molding a plate-shape resin member, but it can also be easily obtained by resin injection molding using a very simple die.

The base 1 and the cover 2 of the wire fitting 10 may be separate members, but it is also possible that the base 1 and the cover 2 are configured to be connected via a connection portion that can be elastically bent and deformed.

It is also possible that the cover 2 of the wire fitting 10 is a member having a flat plate shape. However, in this case, it is preferable that the projection portions serving as spacers for holding the gap between the base 1 and the cover 2 are formed on the side of the base 1.

What is claimed is:

1. A wire harness comprising:
   a wire bundle including a plurality of wires;
   a wire fitting including a base and a cover, the base supporting a portion of the wire bundle from one side and having a periphery, the cover being assembled to the base and covering the portion of the wire bundle together with the base;
   a first tie member that ties together a portion of the plurality of wires of the wire bundle, the first tie member being freely movable relative to the base;
   a second tie member that ties together all wires of the tied portion of the plurality of wires, the second tie member being freely movable relative to the base, the tied portion of the plurality of wires extending in a first direction from the first tie member to the second tie member and having a first length between the first tie member and the second tie member in the first direction; and
   a protrusion that is formed protruding from a surface of the base of the wire fitting, the surface facing the cover, the protrusion extending through the tied portion of the plurality of wires at a region of the first length of the tied portion that is between the first tie member and the second tie member,
   wherein the first tie member and the second tie member cooperate with the protrusion to limit movement of the tied portion of the plurality of wires relative to the base such that movement of all wires of the tied portion relative to the base in the first direction is limited to the first length between the first tie member and the second tie member, and
   wherein the base includes:
      a plate-shaped wiring portion having a periphery, and
      an outer frame at the periphery of the base and extending continuously about the periphery of the plate-shaped wiring portion, the outer frame being raised relative to the plate-shaped wiring portion about the periphery of the plate-shaped wiring portion by a step extending from the plate-shaped wiring portion to the outer frame, the protrusion being spaced from the periphery of the plate-shaped wiring portion, the protrusion having a first end at the surface of the outer frame and extending away from the surface of the outer frame to a second end spaced from the surface of the outer frame.

2. The wire harness according to claim 1, further comprising:
   a hole portion that is formed in the cover of the wire fitting at a position opposing the protrusion of the base, a tip of the protrusion piercing the wire bundle being inserted into the hole portion.

3. The wire harness according to claim 2,
   wherein the hole portion of the cover of the wire fitting is a through hole.

4. The wire harness according to claim 1,
   wherein the base and the cover of the wire fitting are obtained by vacuum-molding flat plate-shaped resin members.

5. The wire harness according to claim 1, further comprising an inclined surface extending from the base to the raised outer frame.

6. The wire harness according to claim 5, wherein the cover comprises:
   a plate-shaped surface having a periphery, and
   a second outer frame extending continuously about the periphery of the plate-shaped surface, the second outer frame having a surface substantially parallel to the plate-shaped surface and raised relative to the plate-shaped surface about the periphery of the plate-shaped surface by a step extending from the plate-shaped surface to the second outer frame, the plate-shaped surface and the second outer frame of the cover being complementary to the plate-shaped wiring portion and the outer frame of the base.

7. The wire harness according to claim 6, wherein the cover includes:
   an inclined surface arranged complementary to the inclined surface of the base.

8. The wire harness according to claim 7, wherein the inclined surface of the base and the inclined surface of the cover cooperate to direct the portion of the tied wire bundle from the protrusion to the plate-shaped wiring portion with obtuse angle bends.

9. The wire harness according to claim 1, wherein the tied portion of the plurality of wires has a second length extending in the first direction from the first tie member past the protrusion, through the second tie member, and outward of the periphery of the base, and
   wherein a portion of the second length of the tied portion of the plurality of wires is disposed outward of the periphery of the base.

10. The wire harness according to claim 9,
    wherein the protrusion cooperates with the first tie member to limit the portion of the second length of the tied portion of the plurality of wires that is disposed outward of the periphery of the base to a predetermined maximum length.

11. The wire harness according to claim 10,
    wherein the second tie member cooperates with the protrusion to limit the portion of the second length of the tied portion of the plurality of wires that is disposed outward of the periphery of the base to a predetermined minimum length.

* * * * *